Figure 1:
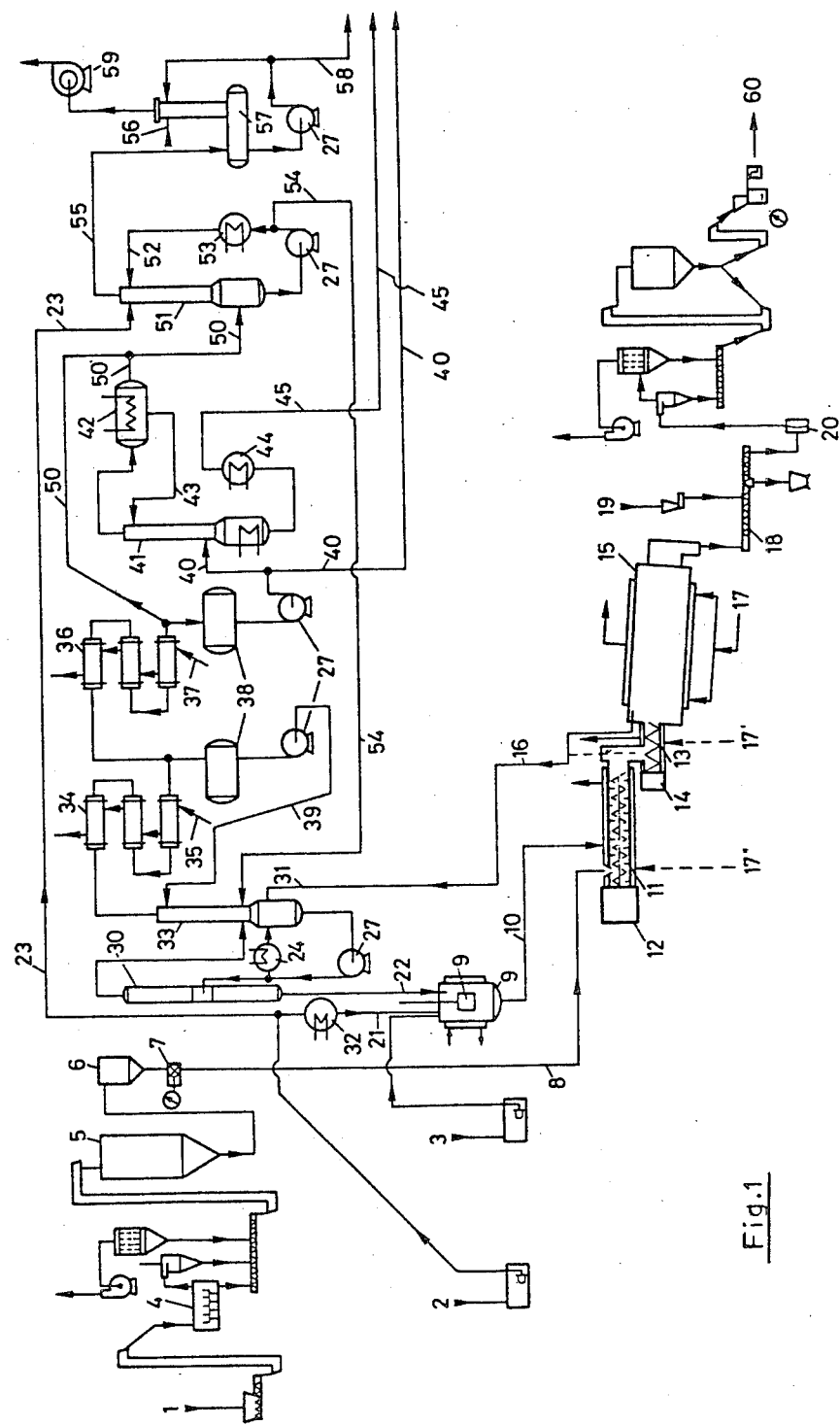

United States Patent [19]

Boese et al.

[11] Patent Number: 4,460,551
[45] Date of Patent: Jul. 17, 1984

[54] PROCESS AND DEVICE FOR MANUFACTURING SYNTHETIC ANHYDROUS CALCIUM SULPHATE AND PURE HYDROFLUORIC ACID

[75] Inventors: Dieter Boese, Therwil; René Etter, Pratteln, both of Switzerland

[73] Assignee: Buss AG, Basel, Switzerland

[21] Appl. No.: 456,090

[22] PCT Filed: Dec. 28, 1981

[86] PCT No.: PCT/CH81/00146

§ 371 Date: Dec. 28, 1982

§ 102(e) Date: Dec. 28, 1982

[87] PCT Pub. No.: WO82/03848

PCT Pub. Date: Nov. 11, 1982

[30] Foreign Application Priority Data

Apr. 28, 1981 [CH] Switzerland .................. 2745/81

[51] Int. Cl.$^3$ .................. C01B 7/08; C01B 7/18; C01F 11/46
[52] U.S. Cl. .................. 423/166; 423/485; 423/555; 422/189
[58] Field of Search .................. 423/555, 483, 484, 485, 423/488, 166; 422/189

[56] References Cited

U.S. PATENT DOCUMENTS

| | | | |
|---|---|---|---|
| 2,753,245 | 7/1956 | Mitchell et al. | 423/485 |
| 3,004,829 | 10/1961 | Boyle et al. | 423/485 |
| 3,919,399 | 11/1974 | Schabacker et al. | 423/485 |
| 4,078,047 | 5/1978 | Spreckelmeyer | 423/555 |
| 4,150,102 | 4/1979 | Schabacker et al. | 423/555 |

FOREIGN PATENT DOCUMENTS

| | | | |
|---|---|---|---|
| 1261835 | 2/1969 | Fed. Rep. of Germany | 423/484 |
| 2279664 | 2/1976 | France . | |
| 540195 | 11/1973 | Switzerland . | |
| 617641 | 6/1980 | Switzerland . | |
| 1077905 | 8/1967 | United Kingdom | 423/485 |

OTHER PUBLICATIONS

Kaiser Victor, Siedegleichgewichte von Systemen mit Fluorowasserstoff, PhD Dissertation, Von der Eidgenossischen Technischen Hochschule in Zurich, 1964.
Ullmans Encyklopädie der Technishen Chemie, 4th Edition 1976, vol. 11, pp. 559-560.
Kirkothmer Encyclopedia of Chemical Technology, 2nd Edition, vol. 9, 1969, p. 619.
Kirkothmer Encyclopedia of Chemical Technology, 3rd Edition, 1980, vol. 10, pp. 742-744.
Ulmans Encyclopedia der Technishen Chemie, 3rd Edition, 1970, Supplemental volume, pp. 449-450.

*Primary Examiner*—Gary P. Straub
*Attorney, Agent, or Firm*—A. A. Saffitz

[57] ABSTRACT

In the process for the production of synthetic anhydrite and pure hydrofluoric acid, a reaction is initiated using fluorspar with a mixture containing sulphuric acid, oleum and the reflux of the acidic scrubbing. The aim is to produce synthetic anhydrite which contains only the desired small proportion of $CaF_2$, while the free $H_2SO_4$ is completely neutralized, but other desirable accelerators are still retained. The reaction is so arranged that fluorosulphonic acid does not enter the reactor at all or only in minute quantity and the new formation of fluorosulphonic acid is effectively repressed. For this end, the components of $CaF_2$ and acid mixture are fed into the reactor at an elevated temperature and the reactor intake is so heated, whereby the reaction is initiated at 100° C. and thus new formation of fluorosulphonic acid is arrested. The exhaust gases from the reactor are hot-dried in a first stage and the dust is expelled, before the material is cooled in the subsequent stages.

11 Claims, 3 Drawing Figures

PROCESS AND DEVICE FOR MANUFACTURING SYNTHETIC ANHYDROUS CALCIUM SULPHATE AND PURE HYDROFLUORIC ACID

Synthetic anhydrite is a highly valued raw material in those countries which do not have sufficient gypsum deposits. This substance is an excellent additive in the cement production industry and is also used in the manufacture of floor coverings, together with floorslabs with integral heating coils. For all these applications it is a primary requirement to secure appropriate purity in the produced material, in order to prevent harmful effects to the cement kiln or in the hard-setting process of premixed anhydrous gypsum or to avoid subsequent blooming. However, anhydrites, with slight contamination of fluorides have been found as rather desirable in the cement production processes and for this reason the synthetic anhydrite, which—in addition—can be prepared with simultaneous production of hydrofluoric acid, became a much sought-after substance.

To enable the continuous production of such anhydrite with optimized properties, the present invention proposes a process and associated equipment for a profitable improvement of the hitherto known methods. The methods which are representative of the present state of the art and are to date in actual usage, are described in sufficient detail in the following publications:

Matthes-Wehner: "Inorganic Technological Processes" VEB Verlag Grundstoffindustrie, (1964) pp. 453-455;

Ullmann: "Encyclopaedia of Industrial Chemistry" 3rd Edition, Supplement (1970) pp. 449,450;

Ullmann 4th Edition, Vol. 11. (1976) pp. 599-601 and

Kirk-Othmer: "Encyclopaedia of Chemical Technology" 3rd Edition, Vol. 10 (1980) pp. 742-744.

In all the large industrial processes used to date in trade production, the following common features are applicable: The remaining HF content, originating from the residual gases prior to the aqueous absorption of $SiF_4$, are scrubbed with cold concentrated sulphuric acid. The so obtained acid mixture of fluorosulphonic acid is intermixed with sulphuric acid and—by the addition of oleum—the residual water is removed. This preliminary process is carried out to enable in the subsequent reaction between fluorspar and sulphuric acid, which has to be carried out at temperatures in excess of approx. 164° C., to separate the fluorosulphonic acid entrained in the recirculation procedure, to liberate therefrom the HF constituent and admit it repeatedly to the prepurifying and condensation treatment. Obviously, this is associated with additional power consumption.

The purpose of the excercise is to produce a synthetic anhydrite, which contains merely the small desirable proportion of $CaF_2$, whilst the free $H_2SO_4$ is completely neutralized, but other desired accelerators will be retained for further usage.

In order to obtain good quality and high grade anhydrite, the reaction between fluorspar and sulphuric acid should be conducted at stochiometric conditions or only with a minute excess of sulphuric acid. A further requirement is that the reaction should be processed at moderate temperatures, in order to prevent the thermal overloading of the precipitated anhydrite.

According to the views of professional experts, the above mentioned requirements are contraindicated, because a relatively fast conversion of $CaF_2 + H_2SO_4$ to HF and $CaSO_4$ can only be obtained at temperatures well beyond 200° C., nevertheless below the decomposition temperature of the sulphuric acid, which is approximately 340° C. This view is apparently confirmed by the overall literature on the subject, as for example, in Kirk-Othmer, 2nd Ed., Vol. 9 (1966) p. 619 is stated, that the conventional reaction time of 30-60 minutes can be obtained at temperatures of 200°-250° C. According to practical experience these data can not be confirmed and the average resindence periods of the material in the reaction zone is frequently much longer, whereby the reactors have to be layed-out with significantly greater dimensions, to meet the requirements.

Should it be attempted to shorten the reaction time, for reasons to increase throughput, by means of operating with a larger excess of sulphuric acid, then the result will be a "wet" anhydrite with too high free sulphuric acid content, which starts to fume after being released from the reactor and—in general terms—enhances corrosion. Should now an attempt be made to elevate the temperature in the reactor far beyond 250° C., to expel the surplus sulphuric acid, then the reactor gases will be burdened in an unnecessary manner. Similar disadvantages will be created by attempting to increase the sulphuric acid concentration in excess of 98% or even using same with free oleum content.

Consequently, ways and means have to be investigated which result in a complete reaction, as far as possible, even under 200° C., if such solution is possible at all.

Further investigation carried out to find out the discrepancy in reaction times between data furnished by the literature and pactical experience led to the recognition, that the data published in literature relate almost in all cases to reactions, which take place between acidity-fluorspar and sulphuric acid of approx. 96% with addition of energy, without participation of the recycled acid mixtures. Namely, these acid mixtures contain a significant part of fluorosulphonic acid, as already mentioned before, which is formed from the $H_2SO_4 + HF$ at temperatures under 100° C. and which is known of adversely effecting the course of reaction due to its partial pressure, but which can be decomposed within the reactor at temperatures above approx. 164° C.

In the course of production, numerous complex intermediate reactions do take place and there is precious little information available on those.

Surprisingly it has now been newly discovered, that the reaction between fluorspar and sulphuric acid, in the presence of fluorosulphonic acid is much more complicated than has been assumed by past knowledge. The acid mixtures exhibit an elevated dissolving power for both, for CaFL and also for $CaSO_4$ and unstable intermediate compounds are formed which may be summarized, as follows:

Calcium fluorosulphonate, $Ca^{++} + HSO_3F^{+-} H_3O^+ + 3F^-$, $Ca(HSO_4.F.HF) + Ca(HSO_4.F)$, $CaF_2.1,86HF$, $Ca(HF_2)_2$, etc.

In addition, conversions are also present involving the impurities present in the spar, which are readily recognized in the literature. In consequence thereof, slurry-like to viscous intermediate states occur in the reaction substances which repeat themselves several times, whilst a crumbling wet consistency is the favourable state for a smooth reaction process. It has been considered on several occasions, to admit part of the developed calcium-sulphate in hot condition to the reaction zone, in order to obtain a crumbly mixture which nevertheless still contains the unstable and undesirable slurry-like intermediate products.

The reaction should be organized in a manner, whereby fluorosulphonic acid does not enter the reactor at all or alternatively only in minute quantity and whereby the regeneration of fluorosulphonic acid is effectively suppressed. To achieve this end, the $CaF_2$ and acid mixture components should be fed into the reactor at elevated temperatures and the reactor intake should be preheated to a degree, whereby the reaction is initiated above 100° C. and thus the regeneration of fluorosulphonic acid is eliminated. For the same reason, the exhaust gases from the reactor should be hot-dried in a first stage and the dust should be precipitated prior to be cooled in a subsequent stage. This is required, because cold scrubbing would enhance regeneration of fluorosulphonic acid vapours and an inappropriate relationship would be set-up between the vapour phase of the rising gases and the reflux, whilst the temperature would be insufficient for the hydrolytic decomposition of the newly generated fluorosulphuric acid formed in the vapourous state.

The scrubbing acid to be recycled, which is discharged from the final stage of the absorption stage at a lukewarm temperature with relatively high fluorosulphonic acid content, is heated in a small separating column. In this manner, the fluorosulphonic acid is cracked and separated, whereby the so separated HF gas can be directly refluxed into the second purifying stage, before the scrubbing acid, which is now in the form of hot and concentrated $H_2SO_4$, is admixed to the reaction acid.

The process specified by this invention, whereby fluorspar is exposed to a reaction with a mixture consisting of sulphuric acid, oleum and the reflux of the acidic scrubbing substances, is characterized in that the acidic mixture, to be fed into a three-stage reactor, is first preheated to a temperature ranging from 100° to 200° C., but preferably in the range of 150°-160° C., thus only a very small part of fluorosulphonic acid will be admitted to the reactor and therein regeneration of fluorosulphonic acid is repressed. By this procedure, the hydrofluoric acid content in the acidic mixture, which is admitted into the reactor to partake in the reaction, is reduced to a minimum, which will be determined by the solubility of the residual hydrofluoric acid in the acidic mixture. In this manner an effect on the main reaction will be achieved, which fosters the thermodynamic generation of new hydrofluoric acid. The intermediate phases of $Ca(HSO_3.-F.HF)$ and $Ca(HSO_4.F)$ are no longer enhanced in their generation to the same extent, as is the case in the known processes. Thus, the residence time for conversion in the reactor is shortened and efficiency increased.

The almost complete elimination of HF from the reactor, which would be fed thereinto by recirculation through the acidic mixture container, has a favourable effect in reducing corrosion in the pipelines and in the equipment.

Figure 2:
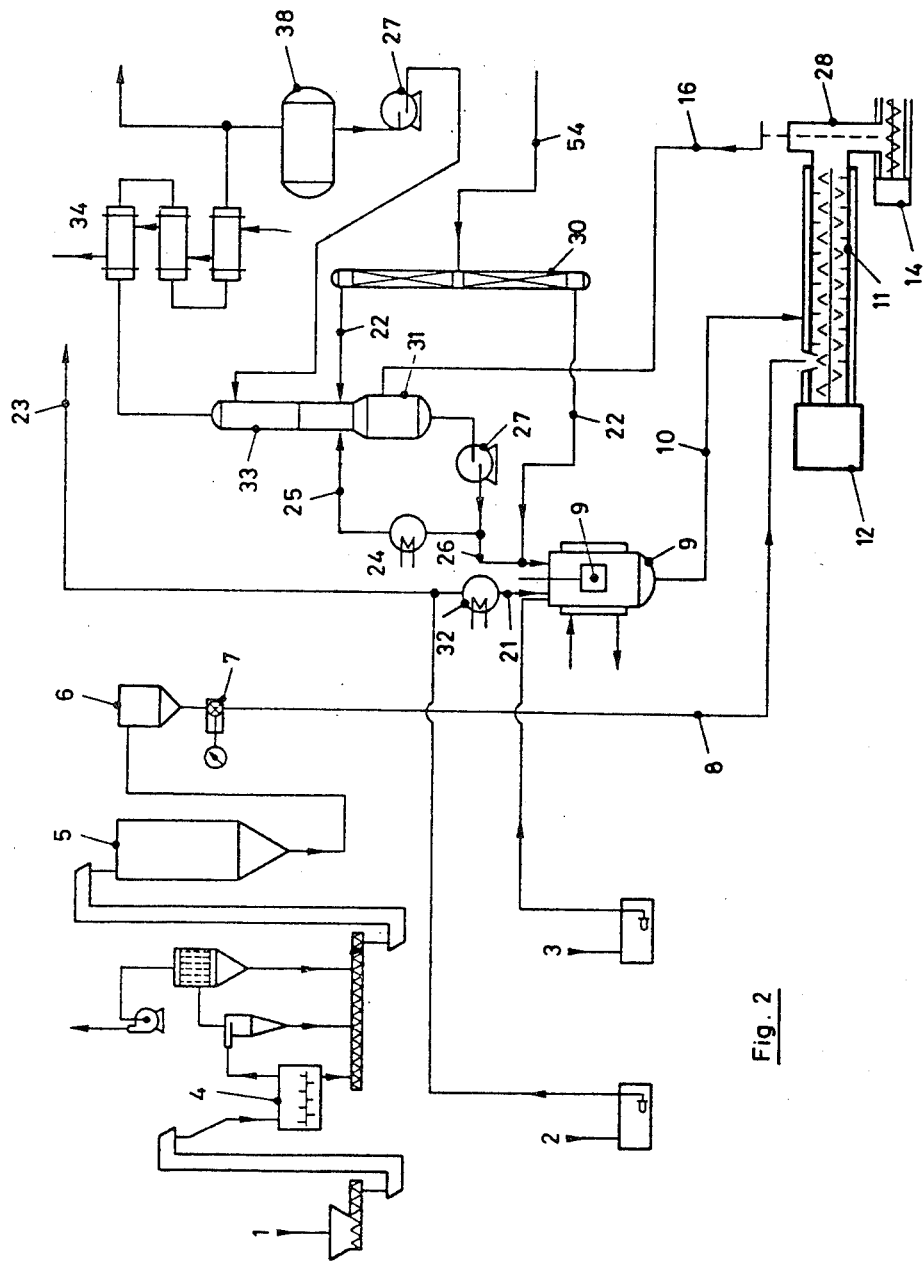
Figure 3:
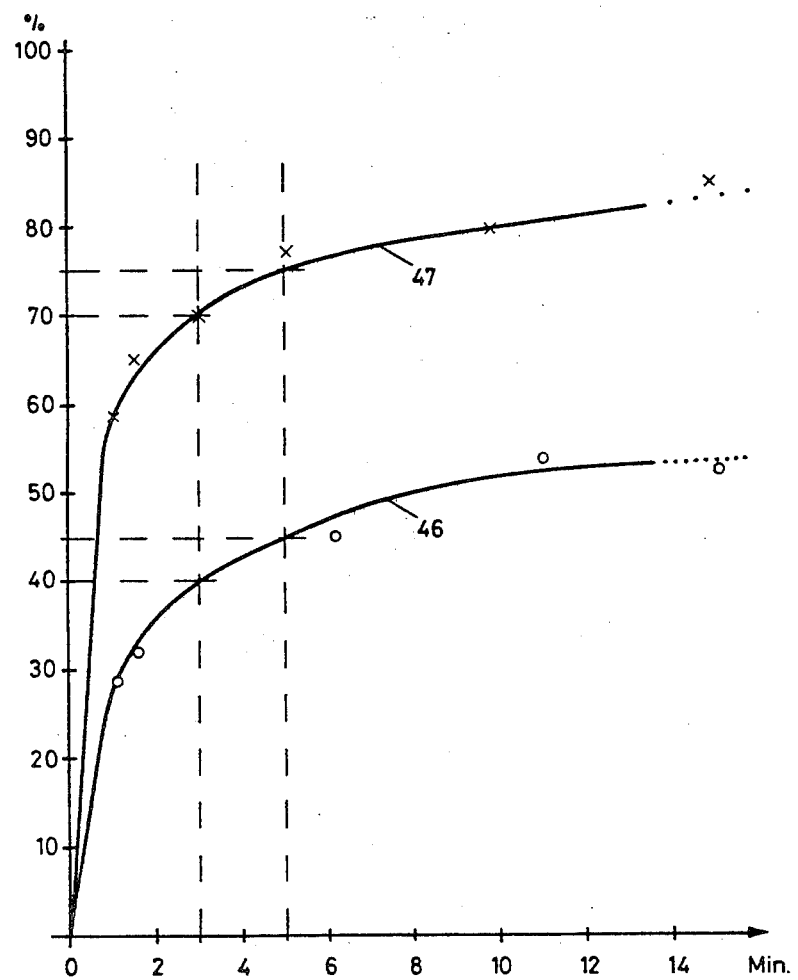

The process and the therefore necessary equipment will now be further elucidated by an exemplified embodiment, in conjunction with the illustrations depicted on the attached drawings, which show:

FIG. 1 a schematic diagram on an exemplified embodiment of the process according to this invention, FIG. 2 an enlarged detail from FIG. 1, but with some variation, and FIG. 3 a diagrammatic presentation of the reaction, to illustrate the progress compared with conventional processes.

The process for the production of synthetic anhydrite may be divided in the following stages:
(1.) reaction for the production of anhydrites,
(2.) the finishing treatment of the anhydrites, up to dispatch,
(3.) purification of the acidic vapours, produced as by-products of the reaction,
(4.) purification of the exhaust gases
(5.) recuperation of the acid components from the scrubbing acids and preparation of the acid mixture to be utilized in the reaction process.

For the production of good quality anhydrite gypsum and pure hydrofluoric acid, firstly the reaction between fluorspar and acid is initiated, whereby the latter is predominantly in the form of 96-98% sulphuric acid, being admitted together with the supply of heat. FIG. 1 indicates this process, as follows:

Fluorspar 1 is preheated in a centrifuge drier 4 and then fed, in hot condition, to a collecting bunker 5 and then into a weighing machine bin 6. From here, the fluorspar is conveyed through a dosing apparatus 7 and through the pipeline 8 to a mixing- and kneading-machine 11, this forming the first reaction stage. The relatively low speed mixing- and kneading-machine 11 is driven by the drive unit 12. This machine is equipped with a non-continuous spiral and the shaft thereof performs a combined rotational and to-and-fro alternating movement, whereby the interruptions in the spiral cooperate with the kneading baffle plates inserted into the spiral housing. Meanwhile, past the spar inlet, viewed in direction of the discharge end, hot acid mixture is sprayed through the pipeline 10 and this is intermixed intensively with the still hot spar, thus initiating a reaction process, which takes place at temperatures of approx. 120°-160° C., but preferably at 130° C.

The average residence time is very short, amounting to 1-3 minutes, for the process in the completely encapsulated and heating mixing- and kneading-machine 11 and as the material is discharged therefrom, already a large amount of HF is liberated. The conversion reaction is almost completed to a degree of in excess of 70%, when the reaction material is discharged from the subsequent single axle mixer in a wet crumbly condition, which actually forms the second stage of the reaction process. The single spiral machine 13 is equipped with beater paddles, is heated on its external mantle and driven by the gear unit 14. The rotational speed of this single spiral machine is considerably higher than the speed of the preceding mixing- and kneading-machine 11 of the first stage.

The paddles subject the material to a beating action and meanwhile transport it into the third reaction stage. This third stage consists of an externally heated rotary kiln 15, being rotated only by the moderate speed of approx. 1-3 r.p.m., in order to allow sufficiently long average residence time for the reaction material. The rotary kiln 15 heating is so arranged that the temperature at the inlet end is approx. 200° C. and increases towards the discharge end to reach there a temperature of approx. 300° C. Depending on the spacial conditions, i.e. on the diameter of the rotary kiln, the exhaust facilities for the contaminated HF gases are either arranged at the furnace lining or at the vertical drop chute 28.

The residence period in the rotary kiln 15 is so dimensioned that, when the anhydrite gypsum is discharged from the rotary kiln into the appropriate screw conveyor 18, only minute parts of $H_2SO_4$ are left therein and the $CaF_2$ content is less than 1%. The residual neutralization is carried out in said screw conveyor 18 by the addition of the necessary small amount of $Ca(OH)_2$ from device 19.

The anhydrite is then passed through a finishing machine 20 and stored in bunkers, prior of being loaded into bags 60 or into containers. Should the anhydrite not be destined for use as a cement retarder, but rather to be used as a high quality structural material, then it is recommended to admix right to the spar approx. 0,4 to 0,7% $K_2SO_4$ as an accelerator. Although this substance does not participate in the reaction, but it will be extremely finely distributed in the anhydrite in course of the precessing.

The hydrofluoric acid, obtained as a by-product in the preparation of anhydrite, represents a valuable product, provided that it is obtained having the required purity grade and this can be secured in an economically viable manner. The hydrofluoric acid vapours, which are collected from the three-stage reactor system held under slight underpressure and collected in the pipe 16, are still badly contaminated with the following substances:

| | |
|---|---|
| Dust, $SO_2$, $CO_2$ | 1,4% |
| Infiltrated air | 1.6% |
| Water vapour | 2,4% |
| $H_2SO_4$ | 4,4% |
| $SiF_4$ | 2,6% |
| Residual HF approx. | 87,6% |

These HF gases, laden with water vapour and low volatility impurities, being at the temperature of approx. 180° C., are fed into the lower portion of a column which is structured as a drier 31. Within this containment, cold and/or cooled acid mixtures, at temperatures ranging from approx. 18° to 80° C., in the average say 70° C., are trickled, which absorb the water vapour and scrub the dust. Meanwhile, part of the $HSO_3F$ contained therein will be cracked and the bound HF is thus separated by the hot gases or the regeneration of same is being repressed. The HF enriched gases rise towards the upper portion 33 of the column at temperatures ranging from 40° C. to 70° C., where these are trickled with HF at the temperature of 17° C. released from the head of said column. Thus, further impurities are scrubbed in this manner and the precipitate is collected in the lower part of the column. In this process, the gas mixture is cooled down to approx. 22° C. and thus departs from the higher ranges 33 of the column. The gas mixture is then channelled into approx. 10° C. water-cooled condensers 34, where part of it is condensed and flows into the container 38. This portion is pumped back into the head 33 of the column by means of the circulating pump 27. Another portion of these gases proceeds into the second condenser 36 at approx. 17° C. temperature and is cooled down here with brine, whereby the condensate is discharged at 9° C. temperature into another container 38. From these latter containers the HF is pumped by the integrated pumps 27, through the pipeline 40 into the storage containers, whereby the purity of the so obtained HF is better than 99,5%.

This degree of purity is quite adequate for numerous technological applications. Conversely, for specially high purity requirements, the acid may be pumped into the rectifier column 41, where the residual highly volatile impurities can be expelled using small amounts of HF. The hydrofluoric acid with a purity better than 99,99% is collected in the sump, drawn-off through the cooler 44 being brought to a temperature of 10° C. and discharged through the pipeline 45 into a storage tank.

The composition of the residual gases, which are collected from the head of the condenser 36 and the rectifier columns 41, 42 through pipes 50 and 50' at a temperature of approx. 12° C., is in approximation as follows:

75% HF
11% $SiF_4$
7% Infiltrated air
7% Residue, $SO_2+CO_2$, etc.

This mixture is stripped of its HF content to a great extent in the absorption column 51. Not more than one-third of the gas quantity escapes through pipeline 55 with an approximate composition of:

24% HF
35% $SiF_4$
21% Infiltrated air
20% Residue, $SO_2+CO_2$, etc.

This is charged into the container 57, whereat the residual gases are scrubbed with cold water 56 together with the weak acids entrained in the circulation as long, until the weak acid can periodically be drawn-off through the pipe 58 with the approximate composition of 5% HF, 20% $H_2SiF_6$ and 75% $H_2O$. Less than 2% of the produced HF + $SiF_4$ finishes in the weak acid collector pipe 58. The exhaust air, which is drawn-off by the exhaust fan 59, contains less than 0,01% HF, to be discharged through the exhaust chimney with dilution.

Subsequent process is the recovery of the fluorine fraction from the scrubbing acids collected in the absorption column 51 and in the drier 31, together with the preparation of the hot acid mixture 10 which forms the inflow to the first reaction stage represented by the mixing- and kneading-machine. The cool scrubbing acid of approx. 18° C. temperature from the pipeline 54, containing approx. 44% HF+55% $H_2SO_4$ being predominantly in the form of fluorosulphonic acid with approx. 1% water, is sprayed-in at the lower one-third of the drier 31. Meanwhile, part of the scrubbing acid is added here which is collected in the sump of the drier 31 at approx. 80° C. and having a composition of approx. 16% HF in 75% $H_2SO_4$ likewise in the form of fluorosulphonic acid with approx. 9% water. The recycled portion from the circulation of this scrubbing acid is cooled down by approx. 10° C. in the cooler 24. However, the major portion is passed into the centre part of the heated separator column 30, wherein the fluorosulphonic acid is almost completely cracked, thus the developed HF vapours can be drawn-off at the head and fed to the lower one-third of the cooling column 33. The hot sulphuric acid, having now a temperature of approx. 160° C. and is liberated from its HF content, flows from the sump of the column 30 through the pipeline 22 into the mixing vessel 9, which is equipped with heating jackets and the agitator 9'. In there, fresh sulphuric acid 21 is admixed, being admitted in large quantity through the pipeline 21, after having been brought to a temperature of approx. 140° C. in the heater 32. Meanwhile, approx. 20° C. cold oleum 3 is admixed, which binds the water being contained in the mixture and is converted to concentrated sulphuric acid in an exotherm reaction.

The so formed acid mixture, consisting of approx. 97,8% $H_2SO_4$ and less than 1% HF, flows now continuously into the mixing- and kneading-machine, representing the first reaction stage 11, through the pipeline 10 having a temperature of approx. 140° C. The alternative depicted on FIG. 2 will be elucidated at the end of the now following Example.

EXAMPLE 6550 kg/h fluorspar 1 with a purity of 97% is continuously fed into the mixing- and kneading-machine 11 at a temperature of approx. 100° C. In the acid mixing vessel 9, an acid mixture is prepared and this is being composed from—on the one hand—approx. 900 kg/h scrubbing acid 22, being separated at high temperature of approx. 160° C. continuously from the reflux of separation column 30 and contains still approx. 1% HF and—on the other hand—from approx. 3420 kg/h 98% concentrated sulphuric acid 21, obtained from the heater 32 at the high temperature of 140° C. This mixture is then further heated whilst admixing thereto 3789 kg/h oleum 3 at the temperature of 20° C. and is conveyed through the pipeline 10 to be sprayed into the mixing- and kneading-machine 11 at a temperature of 140° C. In the three reaction stages 11, 13, 15 operated with heat input, the following substances are obtained: approx. 3710 kg/h reaction gases at temperatures of approx. 180° C., having an HF content slightly over 80% and approx. 11250 kg/h anhydrite at a temperature of 300° C. The latter is removed by means of a suitable screw conveyor 18, whereby its filling forms a screening effect for the reactor. The gases, being exhausted at a temperature of approx. 22° C. from the scrubbing column 33, contain after purification already 98% HF. After condensation, hydrofluoric acid is obtained in the collecting container 38, this acid having already at this stage a purity better than 99,5%. This hydrofluoric acid may be used for numerous purposes as technologically pure HF without any further treatment and can be withdrawn from said container 38 through the pipe 40. The condensation process is so regulated that the residual gases, which are contaminated with readily evaporating impurities, can be admitted to the absorption column 51 at a rate of 800 kg/h as approx. 80% HF at approx. 9°-12° C., whereat approx. 720 kg/h 98% concentrated sulphuric acid 23 is added in the cold state of 18° C. After absorption, approx. 280 kg/h gases are discharged from the absorption column, whereat the HF content has been reduced below 30% and they contain also approx. 20% air. Approx. 1290 kh/h scrubbing acid at 18° C. are recirculated from the absorption column 51 to the centre section of scrubbing column 33. This scrubbing acid, being recirculated through pipe 54, contains approx. 40% HF, approx. 60% $H_2SO_4$ and 1-3% water as a contamination. Conversely, the scrubbing acid in the sump 31 of the scrubbing column contains HF merely at the rate below 12%.

Pursuant to this Example, approx. 3040 kg/h hydrofluoric acid at approx. 9° C. is tapped-off and pumped into the rectifier column 41. From the sump of this column, approx. 3000 kg/h hydrofluoric acid is drawn-off at 52° C. with better than 99,99% purity, whilst approx. 44 kg/h gaseous impurities are discharged at the temperature of approx. 47° C. through the head of the column at the point marked by ref. No. 50′. The admixture of fresh 20° C. cold, 98% concentration sulphuric acid 23 into the absorption column 51 offers a favourable influence in the condensation- and distillation stages, because the separation of the uncondesable impurities from HF at the head of the columns and/or in the condensate, does not have to be critically regulated. The cracking of HF, which is bound in the form of fluorosulphonic acid and collected in reflux from the sump 31, is taking place in the column 30. The concentrated HF vapours at temperatures in excess of approx. 150° C. are drawn-off at the head and recirculated to the lower third of the scrubbing column 31, 33, whilst the concentrated sulphuric acid, enriched in the sump of column 30, is drained into the acid mixing vessel 9 at a temperature of approx. 150° C. In this process, the HF component in the acid mixture 10 is reduced below 1% and this is fed to the reactor 11 at a temperature of approx. 140° C.

FIG. 2 depicts an alternative method. This is based on the boiling point equilibrium between the HF impurities of dust, $SO_2$, $SO_3$, $SiF_4$, etc., according to the diss. by Kaiser, ETH (1964), whereby this may be regulated in a manner insofar that the development of $HSO_3F$ from $HF+H_2SO_4$ is repressed. As well known, this can be realized at temperatures above 100° C.

At a temperature of 80° C. there is already a formation of 1/7 $HSO_3F$, whilst the rest of this undesired formation is repressed. Amongst the critical phases in this process, there is firstly the drying of the reaction gases which escape from the third reaction stage 15 through the pipeline 16 at temperatures round about 180° C., meaning that the difficulties arise in the separation of the entrained dust and $H_2O$. Obviously, the drying process with $H_2SO_4$ has to be conducted at temperatures as low as possible and for this reason—as the case may be—the fresh or recirculating acid is sprayed into the lower sector of the column 31 at approx. 70° C. Dependent on the setting of the boiling point equilibrium, the possibility still exists to prevent the formation of fluorosulphonic acid in the drying process of the reaction gases. In this particular case, the undesirable formation of fluorosulphonic acid is only impending in principle in the absorption column 51, which is sprayed with concentrated sulphuric acid cooled down to 18° C., in order to obtain the highest possible absorption of HF from the residual gases 50. The scrubbing acid contains here approx. 40% HF, 60% $H_2SO_4$ and some 1-3% water, which are all predominantly compounded in the form of $HSO_3F$ at a temperature of approx. 20° C. According to FIG. 2, this scrubbing acid is cracked in the column 30. From the centre section 31 in the drying column generated HF vapour is exhausted at the head, whilst concentrated and almost HF-free acid is collected in the sump, this being added into the mixing vessel 9 through the pipe 22.

The subsequent scrubbing of the residual gases, in order to recover from those the $H_2SiF_6$ constituent, is carried out in the scrubber 57, whereinto a solution consisting of water and—as the case may be—with addition of alkali is sprayed at the point designated by ref. No. 56, in order to obtain a weak acid at about 20° C. temperature and also to prevent possible reaction losses.

FIG. 3 is added here to point out the advantages. Herein the consideration is based on the already known facts, whereby in intermixing the finely distributed solids (in this case fluorspar 8) with a limited amount of liquid (in this case acid mixture 10) in a purely physical manner, a highly viscous mixing phase will be formed, which can be readily overcome by the introduction of the appropriate shearing forces produced by kneading, whereupon the liberation of HF gases is initiated.

Should this acid mixture contain a certain proportion of fluorosulphonic acid, or is its new formation promoted by low initial temperatures, then—according to the most recent discoveries—unstable intermediate compounds will be formed, which render a pasty consistency for the solid particles and inhibit the progress of the reaction together with the liberation of HF gas. In order to counteract these undesired intermediate conditions, hitherto significantly greater amount of energy had to be used, i.e. the material had to be heated to much higher temperatures, which—in turn—led to undesirable sulphuric acid vapour exhaust losses and these had to be scrubbed and recirculated into the system.

Curve 46 on FIG. 3 shows the conditions rendered by the hitherto applied processes with recirculating acid mixtures containing about 15% $HFSO_3$ at approximately 100° C. temperature. After 3 minutes exposure of the material to mixing- and kneading, a thoughput of only 39% has been achieved and after a total of 5 minutes processing, involving the passage through the second reaction stage 13, this throughput figure rose only to 45%.

Likewise under large scale production conditions and by continuing the operations over several hours it was found that, with an acid mixture containing only 1% $HFSO_3$ and wherein the components have been preheated to about 140° C. prior to the onset of the reaction, the curve marked by 47 is obtained.

In the first stage 11 processing after about 3 minutes already 70% of the potential HF gases have been developed, whilst in the subsequent second stage 13 the reaction proceded up to about 75% in altogether 5 minutes. Surprisingly it was also discovered that the application of the fluidized screw conveyor 13 with separate driving unit 14 activates the residual solid particles to an extent, whereby the progression of the reaction right to the core of the particles is significantly accelerated and in consequence thereof the post reaction period in the third stage 15 can be reduced, which is considered an important advantage.

We claim:

1. In a process for the production of synthetic anhydrite and pure hydrofluoric acid in a reactor having at least two stages in which first reactor stage fluorspar and a hot acid mixture are admitted to initiate the reaction of calcium fluoride with sulfuric acid and produce gases including hydrogen fluoride gases followed by treating said gases in a scrubber with sulphuric acid to remove dust and water, said hot acid mixture comprising sulphuric acid, oleum and previously used scrubbing acid, that improvement consisting of reducing fluorine compounds from the scrubbing acid after it has been used for scrubbing by heating said scrubbing acid to a temperature from 100° C. up to 200° C. in a zone separate from contact with hydrogen fluoride containing process streams at normal pressure prior to addition of said scrubbing acid into the said acid mixture, the fluorine occurring in any form in the acid mixture of sulphuric acid, oleum and previously used scrubbing acid fed to the reactor corresponds at most to an amount of hydrogen fluoride of 1%.

2. A process as claimed in claim 1 wherein the reaction of fluorspar and the acid mixture is initiated by intensive mixing at a temperature of 120° C.-160° C., for a short time period of reaction of about 1 to about 3 minutes and thereafter carrying out the reaction under external heating at temperatures rising to at least 200° C. and up to 300° C.

3. Process according to claim 1 wherein the scrubbing acid used for the preparation of said mixture, contains fluorine in any form that corresponds to at most 1% of hydrogen fluoride.

4. Process according to claim 1, characterized in that the acid mixture is fed into the reactor at temperatures ranging from 150° C. to 160° C.

5. A process according to claim 1 wherein a reactor with a first, a second and a third stage is used.

6. Process according to claim 1 wherein the spent scrubbing acid is introduced into a heated separation column for cracking the fluorosulphonic acid therein and is heated at 150° C.-160° C. in this column, and the acid purified in the sump of the separation column is utilized in the preparation of said acid mixture and that hydrofluoric acid vapour is drawn-off at the head of the separation column.

7. Process according to claim 6 wherein the scrubbed hydrofluoric acid gases are sprayed and cooled with cold hydrofluoric acid, then hydrofluoric acid is separated from the cooled gas stream by condensation, the residual gases from the condensing step are treated with sulphuric acid to absorb them and the acid, from the residual gas treatment which contains fluorosulphonic acid is at least partially led into the separation column.

8. Process according to claim 7 wherein the acid from the treatment of the residual gases is fed into the scrubber, the used scrubbing acid is drawn-off from the scrubber, one part thereof being recirculated into the scrubber and the other part sent into the separation column.

9. A process as claimed in claim 7 wherein the scrubbing acid which is heated to a temperature from 100° C. up to 200° C. is mixed with sulphuric acid and oleum which are also heated so that the entire mixture is separately prepared before introducing it into the reactor for initiating the reaction.

10. A process according to claim 7 wherein the acid used in the treatment of the residual gases comprising hydrogen fluoride is led to the scrubber for scrubbing the gases coming from the reactor into the scrubber in which the temperature in the drying column is controlled in a manner so as to avoid the formation of fluorosulphonic acid therein.

11. A process according to claim 10 wherein the gases from the absorber are water washed to recover a weak acid solution of hydrofluoric acid.

* * * * *

UNITED STATES PATENT AND TRADEMARK OFFICE
CERTIFICATE OF CORRECTION

PATENT NO. : 4,460,551
DATED : July 17, 1984
INVENTOR(S) : Dieter Boese and Rene Etter It is certified that error appears in the above—identified patent and that said Letters Patent is hereby corrected as shown below:

On the Face Sheet of the Patent, Column 1, change the address of inventor Etter from "Pratteln" to --Basel--;

Change "PCT filed December 28, 1981" to --December 21, 1981--;

Column 2, under OTHER PUBLICATIONS:

Line 1, change "Kaiser Victor" to --Victor Kaiser--;

Line 2, change "Von" to --von--;

Lines 2 and 3, change "Eidgenossischen" to --Eidgenössischen--

Line 4, change "Ullmans" to --Ullmanns--;
change "Technishen" to --technischen--;

Line 5, change "559-560" to --599-601--;

Line 6, change "Kirkothmer" to --Kirk-Othmer--;

Line 7, change "1969" to --1966--;

Line 8, change "Kirkothmer" to --Kirk-Othmer--;

Line 10, change "Ulmans" to --Ullmanns--;
change "Encyclopedia" to --Encyklopädie--;
change "Technishen" to --technischen--.

Signed and Sealed this

Twenty-fifth Day of December 1984

[SEAL]

Attest:

GERALD J. MOSSINGHOFF

Attesting Officer

Commissioner of Patents and Trademarks